United States Patent
Yogev

(10) Patent No.: US 10,631,306 B2
(45) Date of Patent: Apr. 21, 2020

(54) WIRELESS SPECTRUM MANAGEMENT SYSTEM

(71) Applicant: Amimon Ltd., Ra'anana (IL)

(72) Inventor: Ron Yogev, Netanya (IL)

(73) Assignee: AMIMON LTD., Ra'anana (IL)

( * ) Notice: Subject to any disclaimer, the term of this patent is extended or adjusted under 35 U.S.C. 154(b) by 0 days.

(21) Appl. No.: 16/066,676

(22) PCT Filed: Dec. 28, 2016

(86) PCT No.: PCT/IB2016/058040
§ 371 (c)(1),
(2) Date: Jun. 28, 2018

(87) PCT Pub. No.: WO2017/118900
PCT Pub. Date: Jul. 13, 2017

(65) Prior Publication Data
US 2019/0014582 A1  Jan. 10, 2019

Related U.S. Application Data

(60) Provisional application No. 62/274,808, filed on Jan. 5, 2016, provisional application No. 62/378,285, filed on Aug. 23, 2016.

(51) Int. Cl.
*H04W 72/08* (2009.01)
*H04W 16/14* (2009.01)
(Continued)

(52) U.S. Cl.
CPC ......... *H04W 72/082* (2013.01); *H04W 16/10* (2013.01); *H04W 16/14* (2013.01); *H04W 72/04* (2013.01)

(58) Field of Classification Search
CPC ... H04W 72/082; H04W 16/10; H04W 16/14; H04W 72/04
See application file for complete search history.

(56) References Cited

U.S. PATENT DOCUMENTS 5,491,837 A * 2/1996 Haartsen ............. H04W 52/242
455/62
2008/0137620 A1* 6/2008 Wang ................. H04W 72/0446
370/337

(Continued)

FOREIGN PATENT DOCUMENTS

WO    2013/027026    2/2013

OTHER PUBLICATIONS

International Search Report in PCT international application PCT/IB2016/058040, dated Apr. 6, 2017.
(Continued)

*Primary Examiner* — Walter J Divito
*Assistant Examiner* — Anthony Luo
(74) *Attorney, Agent, or Firm* — Eitan Mehulal Sadot

(57) ABSTRACT

A spectrum management system to allocate frequencies in a plurality of wireless communication systems in geographical proximity includes a spectrum manager to allocate a pool of frequencies among the wireless communication systems. Each system is allocated a set of frequencies for selecting on which frequency to operate with at least one of the sets of frequencies including more than one frequency, and at least two of the allocated sets different from each other. The system additionally includes a database to store and organize information used by the spectrum manager to perform the allocation.

10 Claims, 6 Drawing Sheets

(51) Int. Cl.
*H04W 16/10* (2009.01)
*H04W 72/04* (2009.01)

(56) References Cited

U.S. PATENT DOCUMENTS

2009/0264123 A1* 10/2009 Agashe ................ H04W 48/20
455/434
2014/0226584 A1* 8/2014 Cullen ............... H04B 7/18508
370/329

OTHER PUBLICATIONS

Written Opinion of the International Searching Authority in PCT international application PCT/IB2016/058040, dated Apr. 6, 2017.

* cited by examiner

WIRELESS SPECTRUM MANAGEMENT SYSTEM

CROSS-REFERENCE TO RELATED APPLICATIONS

This application is a National Stage of PCT international application number PCT/IB2016/058040, having an international filing date of Dec. 28, 2016, published as international publication number WO 2017/118900 A1, which is hereby incorporated by reference in its entirety; which in turn claims benefit and priority from (i) US U.S. provisional patent applications No. 62/274,808, filed Jan. 5, 2016, and (ii) U.S. provisional patent application No. 62/378,285, filed Aug. 23, 2016, both of which are incorporated herein by reference.

FIELD OF THE INVENTION

The present invention relates to spectrum and/or power allocation to reduce channel interference generally and to a system and method for managing spectrum sharing between wireless systems in geographical proximity.

BACKGROUND OF THE INVENTION

Technological advancements have contributed to an increased popularity in remotely piloted vehicles (RPVs) which are frequently used in game applications. These RPVs may include drones in the form of planes and multi-rotor hovercrafts, as well as land vehicles and marine vehicles.

Popular game applications for RPVs may include racing and pursuit games. These games generally involve a number of players each with his own RPV system which includes two stations, a first station the RPV, for example a drone, and the second station a remote control base unit for controlling the drone. Some systems may include a display on the remote control base unit to view the images and other information which may be received from the drone while other systems may include viewing glasses which may be worn by the player or other display means in addition to, or in lieu of, the display on the base unit.

A major problem encountered in game applications involving a number of players and multiple numbers of RPV systems is spectrum sharing, that is, how to allocate frequencies to the multiple systems so that they do not interfere with one another due to their geographical proximity. An example of such an interference situation is shown in FIG. 1 which schematically illustrates a typical game application scene 10 with multiple RPV systems and interference sources.

In game application scene 10 which may be a RPV racing scene, two RPV systems 12A and 12B are shown in geographical proximity. RPV system 12A includes an RPV 14A and a remote control base unit 16A and RPV system 12B includes RPV 14B and a remote control base unit 16B. Uplink and downlink communication may include control data on the uplink, and video and other data which may be related to the operational status and/or position of the RPV on the downlink. In RPV system 12A, communications between RPV 14A and remote control base unit 16A may be over CH1, represented by bidirectional arrow 18A, where CH1 may be a same channel for the uplink and downlink communications, or may represent two different channels, one for the uplink and one for the downlink. In RPV system 12B, communications between RPV 14B and remote control base unit 16B is over CH2, represented by bidirectional arrow 18B, and where CH2 may represent similarly to CH1 a same channel for the uplink and the downlink or one channel for the uplink and another channel for the downlink. and where in some cases, CH1 and CH2 may be at the same frequency or proximal to one another to result in interference. Transmissions from base unit 16A or from RPV 14A may cause interference 22 in CH2, as indicated by hatched arrow 18B, and may affect the performance of RPV system 12B. Additionally or alternatively, other RF transmissions may cause interference, for example, from a radar station 20 which may cause interference 24 in CH2.

Systems have been developed which attempt to solve the problem of inter-channel interference between RPV systems. In one such system, an RPV system upon detecting channel interference from another RPV system or from a radar system, may switch to a better channel which provides the best uplink and/or downlink quality. This is indicated in FIG. 1 by bidirectional arrow 18C which represents new, interference free CH3 to which RPV system 12B has switched. As with CH1 and CH2, CH3 may represent a single channel for both the uplink and downlink, or two separate channels (one for uplink and one for downlink).

SUMMARY OF THE PRESENT INVENTION

There is provided, in accordance with an embodiment of the present invention, a spectrum management system to allocate frequencies in a plurality of wireless communication systems in geographical proximity, the system may include a spectrum manager to allocate a pool of frequencies among the wireless communication systems and a database to store and organize information used by the spectrum manager to perform the allocation. Each system may be allocated a set of frequencies for selecting on which frequency to operate, wherein at least one of the sets of frequencies may include more than one frequency, and at least two of the allocated sets may be different from each other.

There is provided, in accordance with an embodiment, a method of controlling channel interference in a plurality of wireless communication systems in geographical proximity. The method may include allocating a pool of frequencies among the wireless communication systems, wherein each system may be allocated a set of one or more frequencies for selecting on which frequency to operate and wherein at least one of the sets of frequencies may include more than one frequency. At least two of the allocated sets may be different from each other. The method may additionally include storing and organizing information in a database to perform the allocation.

In some embodiments of the present invention, the wireless communication systems may include RPV (remotely piloted vehicle) systems and may include RPV drones.

In some embodiments of the present invention, the database information may include a location and a time of operation of the wireless communication systems.

In some embodiments of the present invention, the database information may include information about channels occupied by interference sources other than the wireless communication systems.

In some embodiments of the present invention, the database information may include information about the number of wireless communication systems in geographic proximity.

In some embodiments of the present invention, the system may include rules for selecting by each system a frequency from the set of frequencies.

In some embodiments of the present invention, the number of frequencies in the pool of frequencies may be greater than the number of wireless communication systems.

In some embodiments of the present invention, the system may include a local manager to receive an extended set of frequencies from the spectrum manager, and to monitor and assess a channel quality associated with at least one of the frequencies in the extended set of frequencies. The local manager may allocate frequency sets to at least one of the wireless communication systems. In some embodiments, the local manager may assess channel interference from potential interfering sources.

In some embodiments of the present invention, the method may include receiving an extended set of frequencies, monitoring and assessing a channel quality associated with at least one of the frequencies in the extended set of frequencies. The method may additionally include allocating frequency sets to at least one of the wireless communication systems. The method may further include assessing channel interference from potential interfering sources.

In some embodiments of the present invention, the spectrum manager may allocate a maximum output power limit for at least one the of the wireless communication systems on at least one of the frequencies of its allocated set of frequencies.

In some embodiments of the present invention, the method may include allocating a maximum output power limit for at least one the of the wireless communication systems on at least one of the frequencies of its allocated set of frequencies.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
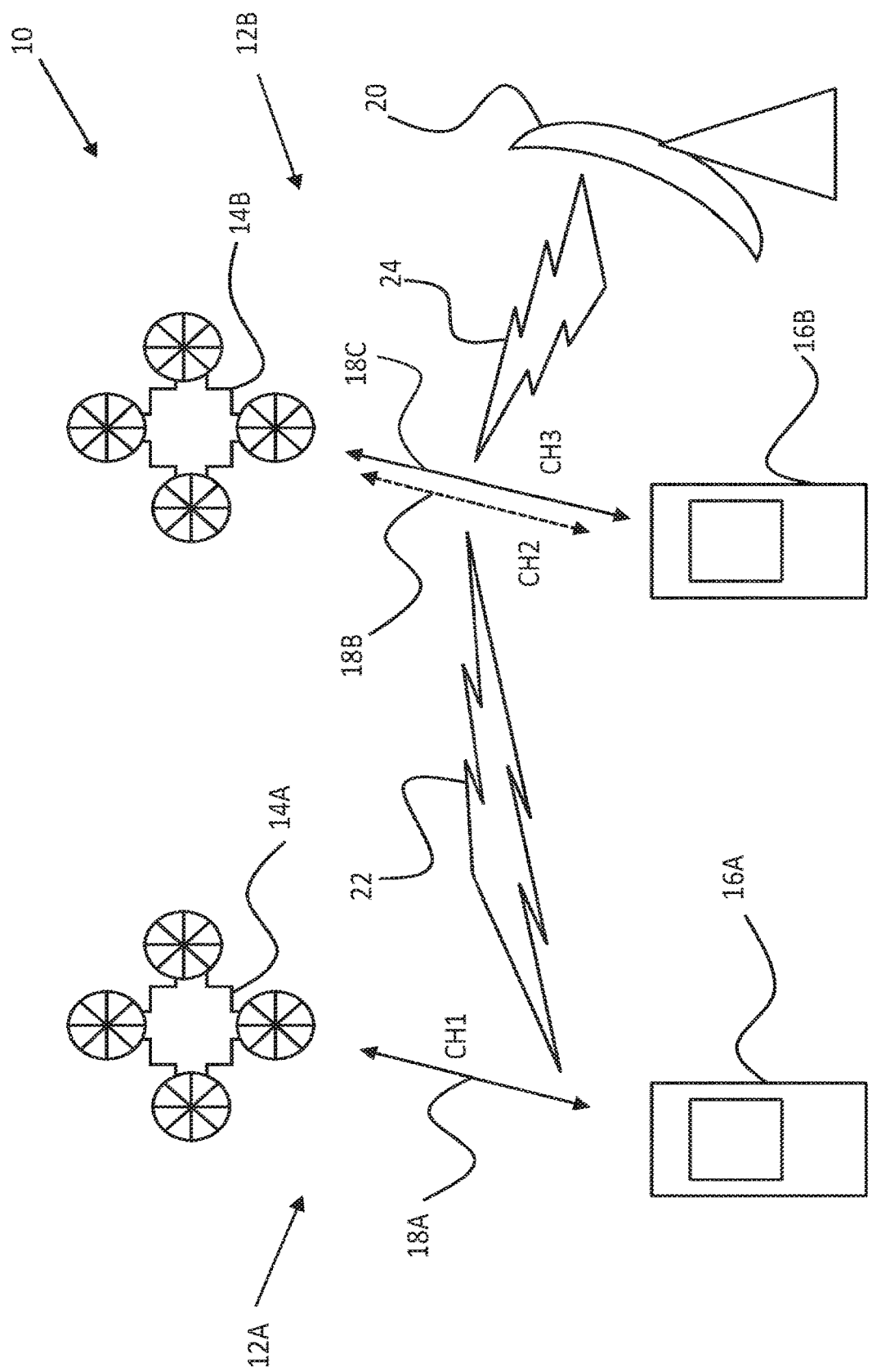
FIG. 1 schematically illustrates a typical game application scene with multiple RPV systems and interference sources.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Methods and systems for spectrum sharing are known in the art. For example, IEEE 802.11af describes a wireless networking standard which allows operation in the TV white space spectrum, with wireless access points and stations querying a geolocation database controlled by a regulatory agency to discover which frequency channels are available to them based on their position at a given time. A problem with the spectrum management system per IEEE 802.11af is that the spectrum management system assigns each station only a single frequency and the station is unable to choose the frequency. In case of channel interference, the station cannot change to another channel without first receiving authorization from the spectrum management system which may be a time consuming process. Another example of spectrum sharing may be found in wireless enterprise installations where there are a number of access points inside a large area and the number of available channels is less than the number of access points. The spectrum management system in these types of installations controls the frequencies of the access points (again, each access point is given a single frequency) and the users are free to use whatever frequency that they want. A problem which may arise is channel interference as two (or more) users may operate on a same channel.

Applicant has realized, as briefly discussed in the Background, that the solution of allocating a number of channels to multiple RPV systems operating in close proximity and having each system switch to a "clean" channel when experiencing interference in the channel being used may prove effective in many circumstances, yet does not address all sources of potential interference. One important source of potential interference, Applicant has realized, is not only the players (RPV systems) in the multi-player game (e.g. racing), but rather may include the non-players, that is, the spectators of the game (other wireless devices carried by the spectators). The non-players may actually consume a larger part of the spectrum compared to the players and may frequently occupy channels which may have been allocated to the players, interfering with the channel communication when the player switches into the channel.

Applicant has further realized that increased interference may also result from players and/or non-players of other games which are closely positioned geographically. Applicant has additionally realized that, as the allocation of channels is specific for each RPV system, two RPV systems may switch to a same "clean" channel at the same time. In order to reduce the probability of this occurrence, for a game requiring N channels, $N*(1+\alpha)$ channels need to be allocated to all the players, where a is large, e.g. $0.1<\alpha<1.2$.

Applicant has realized that the above problems associated with the prior art may be overcome by a wireless spectrum management system which includes a spectrum manager which may allocate each RPV system a set (list) of several channels from which a RPV system may select between channels according to channel conditions, each set being different for each player. In some embodiments, the channels may be sufficiently spread out one from the other to avoid interference between the players or alternatively, the channels may be overlapping. In some embodiments, the spectrum manager may allocate power level limits to the different channels allocated to each player to limit RPV system power output to prevent cross-channel interference. It may be appreciated that allocating power level limits to the different channels may be particularly advantageous when channels may overlap or when they are very close together. The allocation of channels and/or power may also take into consideration the channel requirements of potential sources of interference which may not be controlled by the spectrum manager. These may include, for example, game non-players, players and non-players associated with a different game (or games) being played in close proximity, and also outside interference sources which may include radar systems, among other potential sources of interference.

In some embodiments, the total number of allocated channels may be greater than the total number of RPV systems and, optionally, also the potentially interfering sources. In some embodiments, the list of channels may be prioritized, the priority level of each channel determined by the spectrum manager so that a RPV system may select a lower priority channel only if a higher priority channel is occupied by another RPV system or by a potentially interfering source. In some embodiments, the spectrum manager may include a central manager which may delegate some or all of its functions to local managers who may be responsible for allocating channels "on-the-fly" that is, based on real-time sensing of channel conditions. Additionally or alternatively, the local managers may allocate frequency and power limits for the various channels "on-the-fly". Additionally or alternatively, the local managers may provide sensing information directly to the central manager for updating channel and/or power allocations.

In some embodiments, the spectrum management system may allocate power level limits based on the location of adjacent RPV systems and on the location of potentially interfering sources. For example, if adjacent channels are being used by RPV systems which are geographically close, then the maximum transmit power allocated to the geographically close RPV systems occupying adjacent channels may be reduced.

It may be appreciated by a person skilled in the art that, although the wireless spectrum managements system disclosed herein is described with reference to RPV systems, the system may be readily implemented for other types of wireless communication systems which operate geographically proximal to one another and may, as a result, suffer from channel interference due to their proximity. It may be further appreciated by the skilled person that such a spectrum management system may additionally be used in RF environments which include potentially interfering sources which may not be controlled by the manager and which may interfere with the geographically proximal wireless communication systems.

"Off-Line" Spectrum Management System

Figure 2:
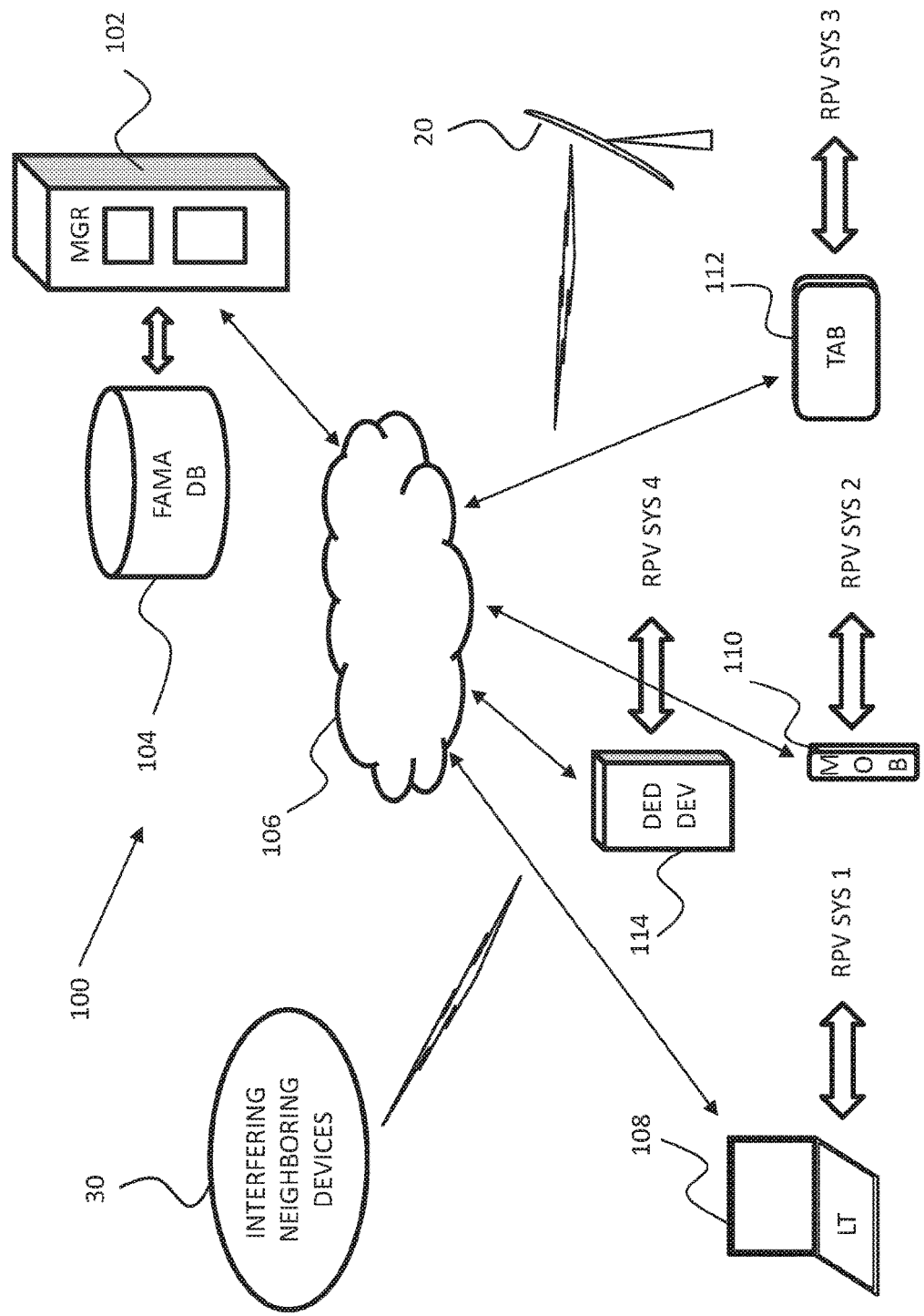
FIG. 2 schematically illustrates an exemplary spectrum management system according to an embodiment of the present invention.

Reference is now made to FIG. 2 which schematically illustrates an exemplary spectrum management system 100, according to an embodiment of the present invention. Spectrum management system 100 may include a spectrum manager 102 and a Frequency and Management Application (FAMA) database 104.

Spectrum management system 100 may manage the frequency allocation of wireless networks, for example wireless networks associated with RPV systems as depicted by RPV SYS1, RPV SYS2, RPV SYS3 and RPV SYS4, when the systems work in parallel and are located so as to potentially interfere with one another. Spectrum management system 100 may additionally take into account in managing the frequency allocation potentially interfering systems which are not controllable by the spectrum management system and may include, for example, radar 20 and interfering neighboring devices 30 such as, but not limited to, non-players devices in an RPV game and other RPV systems and non-players devices in neighboring RPV games. Spectrum management system 100 may additionally or alternative allocate power level limits to the allocated channels.

Spectrum management system 100 may be server based (server may be included in spectrum manager 102 or may optionally be a separate server), optionally cloud based as depicted by cloud 106, and may allow spectrum manager 102 to transfer data to, and receive data from, computing devices associated with the different RPV systems. The computing devices may include but not be limited to, for example, laptop computers as shown by LT 108 associated with RPV SYS 1, mobile phones as shown by MOB 110 associated with RPV SYS 2, tablets as shown by TAB 112 associated with RPV SYS 3, and dedicated devices specifically designed to operate with spectrum management system 100 and with RPV systems as shown by DED DEV 114 associated with RPV SYS 4. In some embodiments, DED DEV 114 may be included in the base unit and/or in the drone in the form of a chip, for example, as an integrated circuit (IC), an ASIC (application-specific IC), a SOC (system-on-chip), among other types of chips, or may be an add-on system with communication capabilities.

Spectrum manager 102 may allocate to RPV SYS 1-RPV SYS 4 in a potentially interfering environment a different frequency, or optionally, a set of frequencies to avoid interference between the RPV systems and also to avoid potentially interfering sources which are not controlled by the spectrum manager, for example radar 20 and interfering neighboring devices 30. Additionally or alternatively, spectrum manager 102 may allocate power level limit to allocated channels. The allocation of frequencies and/or power levels by spectrum manager 102 may be performed "off-line" with the selection of a frequency or set of frequencies, and/or power level limits, for a specific RPV system according to an available frequency and/or power level limit list. The frequency and/or power level limit list may be based on predefined information associated with an event (e.g. RPV race) which may involve several RPV systems, for example RPV SYS 1-RPV SYS 4, operating in the potentially interfering RF environment and/or with the event setup. The information may be stored in FAMA database (DB) 104.

FAMA Database

Figure 3:
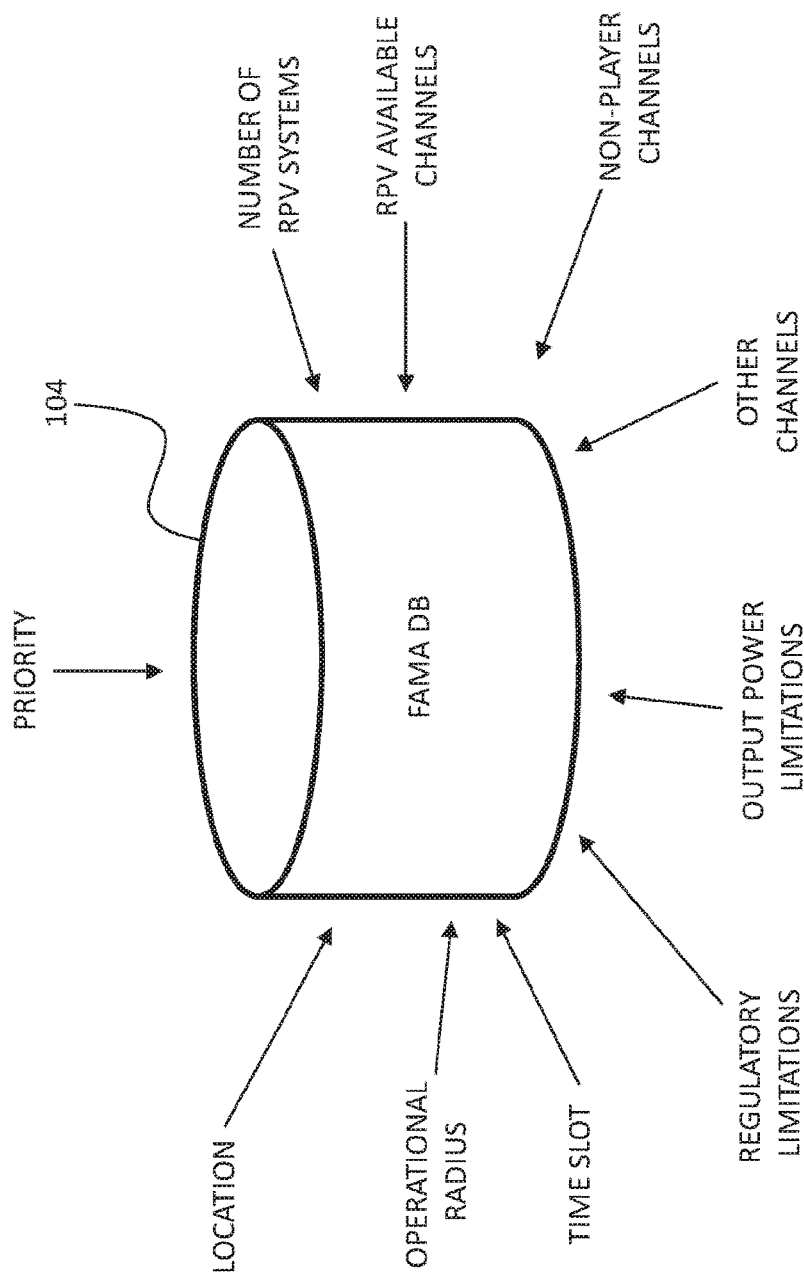
FIG. 3 schematically illustrates an exemplary FAMA DB, according to an embodiment of the present invention.

Reference is now also made to FIG. 3 which schematically illustrates exemplary FAMA DB 104, according to an embodiment of the present invention. FAMA DB 104 may store and organize the predefined information for processing by spectrum manager 102 to allocate the frequency or set of frequencies to each RPV system, and additionally or alternatively to allocate the power level limits. The predefined information may address data which may be relevant to the potentially interfering sources to enable spectrum manager 102 to allocate the frequencies and/or power level limits taking these potentially interfering sources into account.

The predefined information may include, but not be limited to, the following data:

a. Location—the geographical location where the event is taking place and may be defined by map coordinates such as latitude and longitude;

b. Operational radius—the maximum radius of operation of all systems participating in an event relative to the location (a above);

c. Time slot—the period of time allocated to an event including information about event start time and finish time;

d. Regulatory limitations—the regulatory limitations applicable to the wireless systems to be operated during the event and may take into consideration the operation of the potentially interfering sources, among many other parameters associated with regulation compliance (e.g. restrict use of reserved channels and provide bandwidth limitations, location of existing radars and other RF transmission sources);

e. Output power limitations—the power limitations applicable to each RPV system, and may be prescribed by the regulatory limitations (d above) or to prevent interference between adjacent channels for geographically close systems;

f. Other channels—the channels which may be occupied or previously assigned (e.g. by regulatory limitations) to potentially interfering sources such as radars and other outside sources.

g. None-player channels—the channels which may be occupied by spectator wireless devices and by those of players and non-players in one or more neighboring events;

h. RPV available channels—the total number of channels available for all the RPV systems participating in the event;

i. Number of RPV systems—the total number of RPV systems participating in the event; and j. Priority—the prioritization rules which may be used to allow each RPV system to select between channels from the set of channels which it has been allocated by the spectrum manager.

The computing devices, for example computing devices LT 108, MOB 110, TAB 112, and DED DEV 114 may include an application program (AP) which may allow interfacing with the spectrum manager and with the associated RPV systems, and which may allow the computing devices to control the selection of channels in each RPV system based on the allocations provided for each RPV system and/or the to control the allocation of power level limits. The AP may additionally allow computing devices to control channel selection and power level allocations based on channel priority assignment as provided by spectrum manager 102. The computing devices, may allow, in some embodiments, control of the RPV systems functionally performing as a base unit, and optionally also serving to display images acquired by the RPVs The AP may be downloaded from spectrum manager 102 and may include downloading from an Internet website, or may be installed using other known methods (e.g. from driver disk, memory card, etc.).

"On-the-Fly" Spectrum Management System

Figure 4:
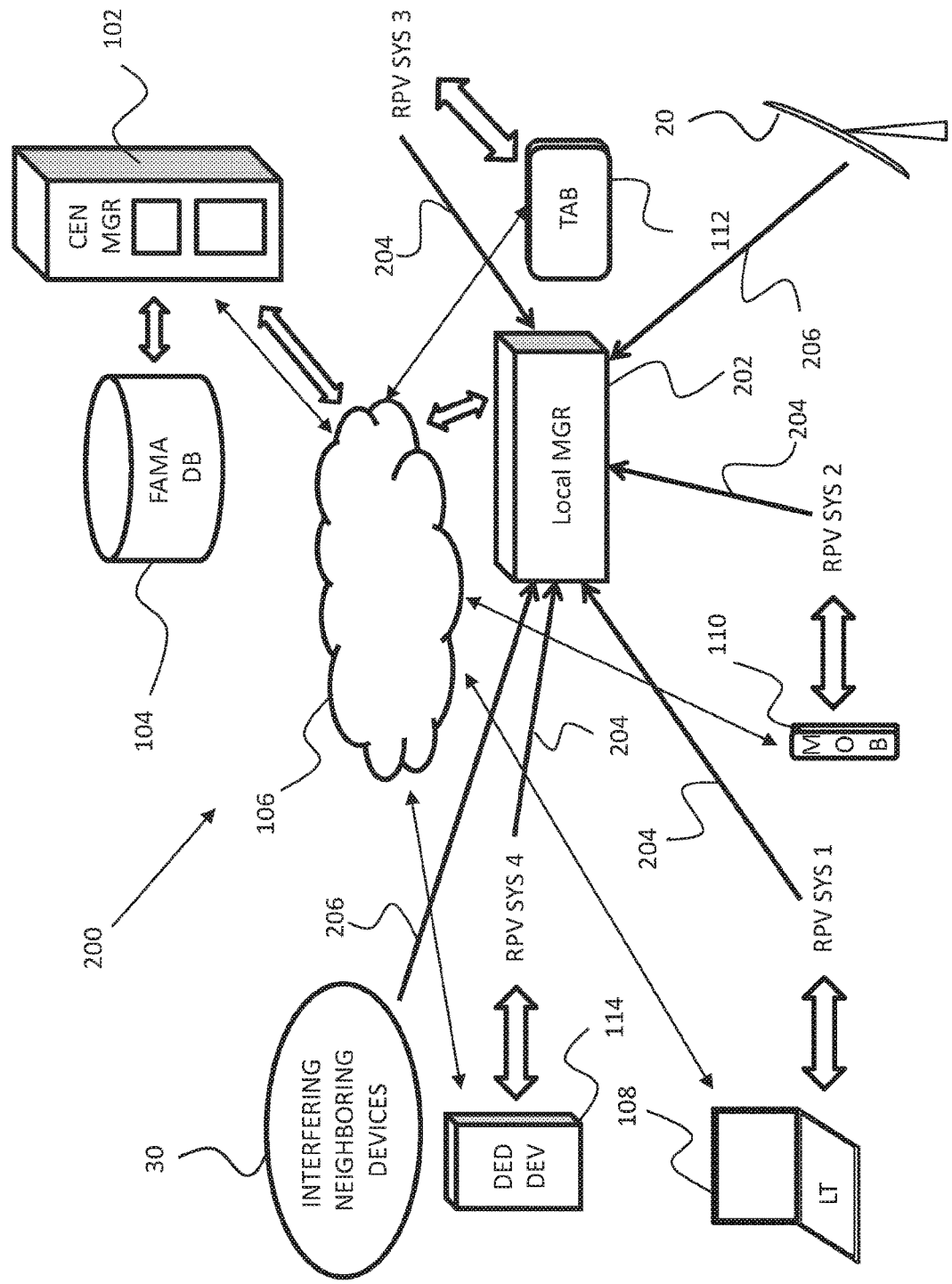
FIG. 4 schematically illustrates another exemplary spectrum management system, according to an embodiment of the present invention.

Reference is now made to FIG. 4 which schematically illustrates another exemplary spectrum management system 200, according to an embodiment of the present invention. Spectrum management system 200 may include spectrum manager 102 and FAMA DB 104 described with reference to FIG. 2, so that the spectrum management system may include all the functional capabilities of spectrum management system 100. Additionally, spectrum management system 200 may include one or more local managers 202 which may serve to provide "on-the-fly" frequency allocation capabilities and/or power level allocations to spectrum management system 200. Similar to spectrum management system 100, spectrum management system 200 may be server based, optionally cloud based as depicted by cloud 106, and may transfer data to, and receive data from, computing devices LT 108, MOB 110, TAB 112, and DED DEV 114.

Local manager 202 may continuously monitor and assess channel quality in the channels allocated to the RPV systems, for example, RPV SYS 1, RPV SYS 2, RPV SYS 3, and RPV SYS 4, as shown by arrows 204. In some embodiments, local manager 202 may periodically or on-demand from spectrum manager, monitor and assess channel quality and/or power level limits in the allocated channels. Local manager 202 may additionally continuously, periodically, or on-demand from spectrum manager, monitor and assess channel interference between the RPV systems, and from the potentially interfering sources, for example, radar 20 and interfering neighboring devices 30, and may determine channel availability and/or power level limits for the RPV systems based on the channel interference monitoring and assessment. In assessing channel quality, in some embodiments, local manager 202 may take into consideration such parameters as regulatory limitations, output power limitations, among other parameters which may influence channel quality.

Local manager 202, based on the assessment of the channel quality and channel interference, may send instructions to the computing devices to change channels within the set of channels allocated by spectrum manager 102 to each computing device and/or to limit power output of the RPV systems. The computing devices may switch channels and/or limit power levels according to predetermined criteria from spectrum manager 102, or alternatively, may switch based on the instructions received from local manager 202 and which may reflect best channel quality (or better channel quality in case of performance degradation). It may be appreciated that an advantage of using local manager 202 is that it may guide an RPV system to an allocated frequency and/or may limit the RPV system output power based on its assessment and knowledge of channel quality for all RPV systems and their frequency and/or power level allocations.

In some embodiments, local manager 202 may send spectrum manager information regarding the instructions provided to the computing devices (i.e. updates the spectrum manager regarding the changes). Local manager 202 may redistribute the allocation of channels and/or power level limits provided by spectrum manager. In some embodiments, local manager 202 may transmit the channel monitoring information to spectrum manager 102 and the spectrum manager may perform the assessment and may provide the computing devices with the respective instructions, which may include reallocating the set of frequencies and/or power level limits allocated to each computing device. Alternatively, local manager 202 may send its assessment to spectrum manager 102 who responsively may send its instructions to the computing devices, including reallocating the set of frequencies and/or power level limits provided to each computing device if necessary.

Alternate "Off-Line" Spectrum Management System

In some embodiments, prior to the start of an event, local manager 202 may assess the channel quality of the allocated channels for each RPV system and may transfer this information to spectrum manager 102 and/or to FAMA DB 104 for storage and processing. Local manager 202 may additionally assess channel interference from the possible interfering sources (e.g. radar 20 and interfering neighborhood devices 30) and may also transfer this information to spectrum manager 102 and/or to FAMA DB 104 for storage and processing. It may be appreciated that use of the monitoring and/or assessment information provided by local manager 202 prior to the start of an event may be particularly advantageous over the "off-line" mode of operation as the "off-line" mode requires predefining the data stored in FAMA DB 104. The predefined data stored in FAMA DB 104 may not necessarily reflect actual channel conditions at the start of the event.

Modes of Operation

The spectrum management system, depending on its configuration, may be configured to operate only in the "off-line" mode (spectrum management system 100), or alternatively, may operate in both the "off-line" mode and the "on-the-fly" mode (spectrum management system 200).

"Off-Line" Mode—Single Frequency Assignment

In this mode, a computing device may receive a single frequency assignment from spectrum manager 102 based on the predefined data input in FAMA DB 104 and may set up a wireless link for the RPV system over the assigned frequency. The RPV system remains on the same channel during the whole session.

"Off-Line" Mode—Multi Frequency Assignment

In this mode, a computing device may receive a plurality of frequency assignments (at least two) from spectrum manager 102 based on the predefined data input in FAMA DB 104. The computing device may scan the assigned channels and may set up a wireless link for the RPV system over the "better" channel, as assessed and selected per predefined criteria for better channel section. The computing device may hop the RPV system to alternative frequencies (from the assigned frequencies) in case of performance degradation, better channel availability, or other events which may require by regulation to free the current channel. In some embodiments, channel selection may be random and may be based on the predefined criteria. Optionally, "better" channel selection may also be based on the predefined criteria.

"Off-Line" Mode—Single Frequency Assignment with Local Manager

This mode may be similar to the "Off-line Mode"—Single Frequency Assignment" with the exception that the single frequency assignment and/or power level allocation from spectrum manager 102 is based on the data input in FAMA DB 104 based on channel quality/interference monitoring and assessment made prior to the start of an event by local manager 202.

"Off-Line Mode—Multiple Frequency with Local Manager

This mode may be similar to the "Off-line Mode"—Multi Frequency Assignment" with the exception that the multi-frequency assignment and/or power level limit allocation from spectrum manager 102 is based on the data input in FAMA DB 104 based on channel quality/interference monitoring and assessment made prior to the start of an event by local manager 202.

"On-the-Fly" Mode—Local Manager

In this mode, as previously described for the "on-the-fly" spectrum management system, the local manager continuously monitors and assesses channel quality of the RPV systems and possible channel interference from potentially interfering sources. Responsive to its assessments, local manager 202 may instruct each computing device to switch to another channel or to limit power level in a particular channel, or may provide spectrum manager 102 with channel monitoring and/or assessment information so that the spectrum manager may provide instructions accordingly to the computing devices. In some embodiments, this mode may be used for single frequency assignment and/or for multiple frequency assignment. In some embodiments, local manager monitoring may be periodic, or on-demand from the spectrum manager, or according to predefined criteria.

Method of Setting Up a Spectrum Management Event Including One or More Systems

Figure 5:
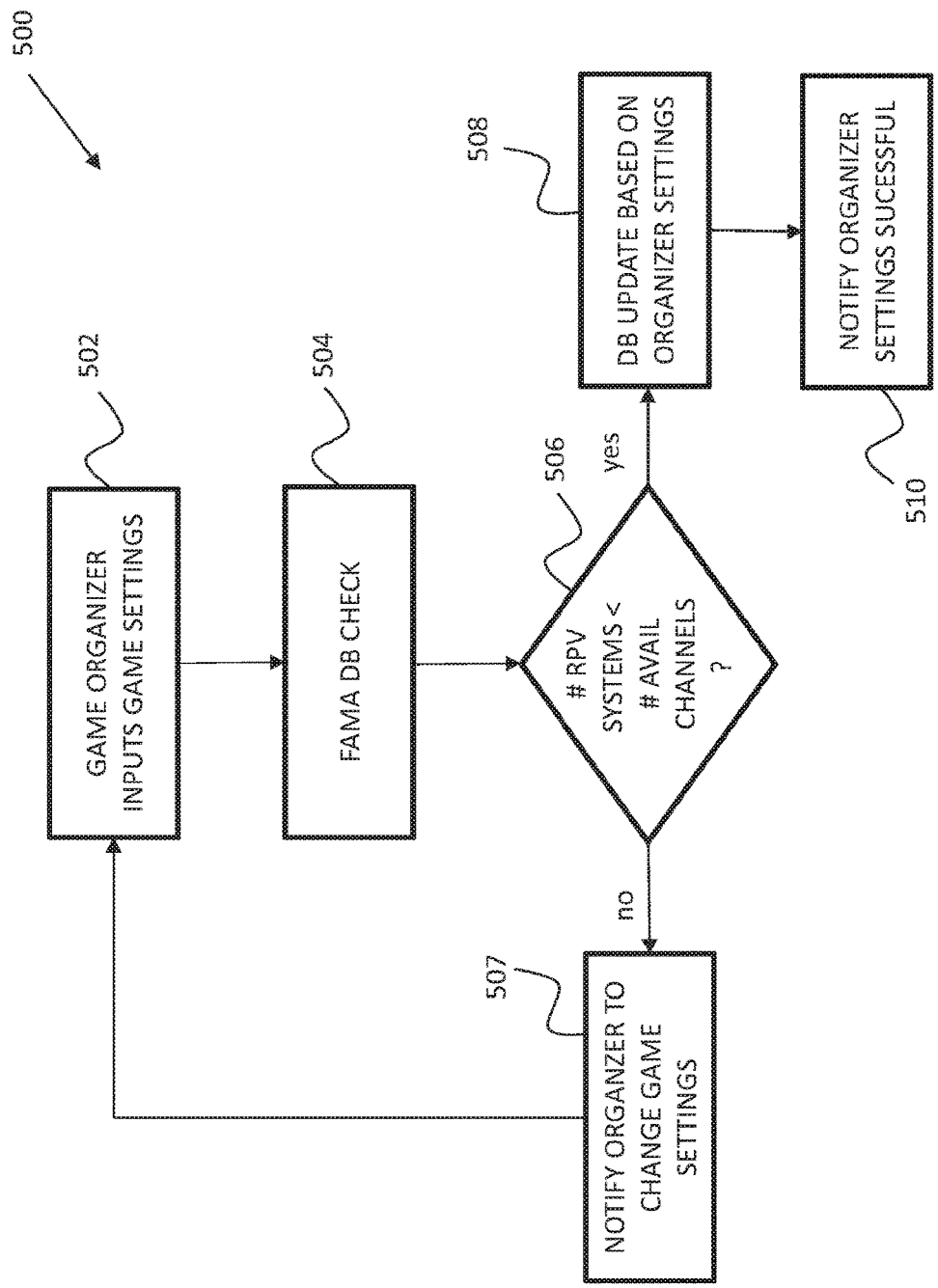
FIG. 5 is a flow chart of an exemplary method of setting an event associated with a RPV game using the spectrum management system, according to an embodiment of the present invention.

Reference is now made to FIG. 5 which is a flow chart of an exemplary method 500 of setting a multi-system spectrum management scenario associated with a RPV game (e.g. RPV racing) using the spectrum management system, according to an embodiment of the present invention. For clarity purposes, reference is made to spectrum management system 100. It may be appreciated by the person skilled in the art that the method described may be implemented using more or less step, and/or a different sequence of steps, and that, although described with reference to setting up an event for a game, the method may be applied for setting up non-game related events which may include use of a spectrum management system.

At 502, game settings which may include the location of the event, the time slot of the event, and the number of participants which may include the actual number of participants or the total number of hits allowed for all the participants and assigned to each participant, may be input by a game organizer through a computing device which may be LT 108, MOB 110, TAB 112 or DED DEV 114. In some embodiments, game data may be input using other data input means which may include, for example, a home computer or other computing devices which may be not directly associated with controlling the RPV systems.

At 504, FAMA DB 104 may check the game settings input by the organizer to evaluate if they correspond with the event settings associated with the game and to corroborate that there is no contradiction with other events which may occur at substantially the same time and/or be geographically proximal.

At 506, an evaluation may be made to determine if the total number of available channels which may be allocated to the RPV systems simultaneously participating in the game exceeds the number of RPV systems. The evaluation may be made by spectrum manager 102, by local manager 202, or by FAMA DB 104. If no, continue to 507. If yes, continue to 508.

At 507, the organizer may be notified (on the computing device) that the game settings entered do not correspond with the predefined data in FAMA DB 104 associated with the particular game. Return to 502. For example, the organizer may be notified that the number of available frequencies is limited to three per user and the organizer requests 5 frequencies.

At 508, FAMA DB 104 may be updated with the game settings input by the organizer.

At 510, the organizer may receive on the computing device an indication that input of the settings was successful.

Method of Allocating Channels

Figure 6:
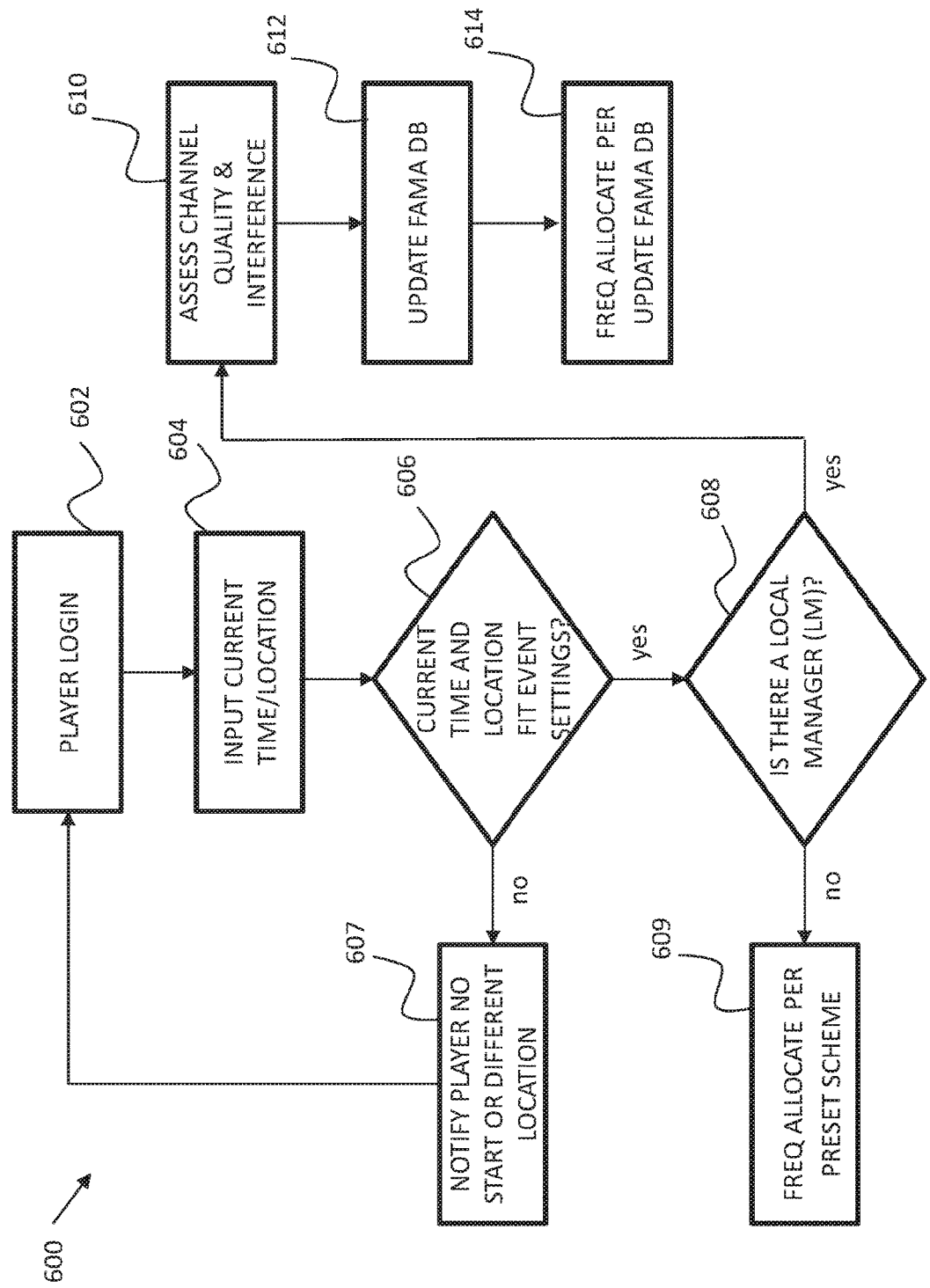
FIG. 6 is a flow chart of an exemplary method of allocating frequencies to RPV systems prior to the start of an event associated with a RPV game using the spectrum management system, according to an embodiment of the present invention.

Reference is now made to FIG. 6 which is a flow chart of an exemplary method 600 of allocating frequencies to RPV systems prior to the start of an event associated with a RPV game (e.g. RPV racing) using the spectrum management system, according to an embodiment of the present invention. For clarity purposes, reference is made to spectrum management system 100 and 200. It may be appreciated by the person skilled in the art that the exemplary method described may be implemented using more or less step, and/or a different sequence of steps, and that, although described with reference to setting up an event for a game, the method may be applied for setting up non-game related events which may include use of a spectrum management system. It may be further appreciated by the skilled person that the exemplary method may be equally apply to the "Off-line Modes" of operation and to the "On-the-fly Modes" of operation.

At 602, a player may login into the spectrum management system through a computing device which may be LT 108, MOB 110, TAB 112 or DED DEV 114.

At 604, game settings which may include the location of the event and the time slot of the event may be input by the game player by means of the computing device.

At 606, FAMA DB 104 may check the game settings input by the player to evaluate if they correspond with the event settings associated with the game. If no, continue to 607. If yes, go to 608.

At 608, a check may be made if the spectrum management system includes one or more local managers 202. If no, continue to 609. If yes, go to 610.

At 609, spectrum manager 102 in spectrum management system 100 may allocate the channels per the predefined data stored in FAMA DB 104.

At 610, local manager 202 in spectrum management system 200 may assess the channel quality of the available RPV system channels and possible channel interference from the potentially interfering sources prior to the start of the event.

At 612, FAMA DB 104 may be updated with the pre-start event assessment information.

At 614, spectrum manager 101 may allocate the channels to the RPV systems based on the updated information in FAMA Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A spectrum management system to allocate frequencies for a plurality of wireless communication systems in geographical proximity,
   wherein the plurality of wireless communication systems includes at least:
      (i) a first wireless communication system which comprises two or more Remotely Pivoted Vehicles (RPVs) that are scheduled to participate in a first game event at a first geographical location in a first time-slot;
      (ii) a second wireless communication system which comprises two or more other Remotely Pivoted Vehicles (RPVs) that are scheduled to participate in a second game event at a second geographical location in a second time-slot;
   wherein the spectrum management system comprises:
   a spectrum manager unit to allocate a first pool of frequencies to the first wireless communication system, and to allocate a second, different, pool of frequencies to the second wireless communication system;
   wherein each RPV that participates in the first game event utilizes only a frequency that is selected from the first pool of frequencies that was allocated to the first wireless communication system;
   wherein each RPV that participates in the second game event utilizes only a frequency that is selected from the second pool of frequencies that was allocated to the second wireless communication system;
   wherein said spectrum manager unit performs allocation of the first and second pools of frequencies by taking into account at least:
   (A) the first geographical location of the first game event, and
   (B) the second geographical location of the second game event, and
   (C) the first time-slot of the first game event, and
   (D) the second time-slot of the second game event, and
   (E) the maximal number of RPVs that are scheduled to participate in the first game event, and
   (F) the maximal number of RPVs that are scheduled to participate in the second game event.

2. The system of claim 1,
   wherein said spectrum manager unit performs said allocation of the first and second pools of frequencies by taking into account also:
   (G1) a maximum operational radius of the first game event; and (G2) a maximum operational radius of the second game event.

3. The system of claim 1,
wherein said spectrum manager unit performs said allocation of the first and second pools of frequencies by taking into account also:
(G) location of a radar station that causes wireless interference.

4. The system of claim 1,
wherein said spectrum manager unit performs said allocation of the first and second pools of frequencies by taking into account also:
(G) wireless channels that are allocated for spectator devices in at least one game event.

5. The system of claim 1,
wherein said spectrum manager unit performs said allocation of the first and second pools of frequencies by:
(i) allocating to the first wireless communication system, a number of frequencies that is greater than the number of RPVs that is scheduled to participate in the first game event;
and
(ii) allocating to the second wireless communication system, a number of frequencies that is greater than the number of RPVs that is scheduled to participate in the second game event.

6. The system of claim 1,
wherein said spectrum manager unit performs said allocation of the first and second pools of frequencies by:
(i) allocating to the first wireless communication system, a number of frequencies that is greater than the sum of: the number of RPVs that is scheduled to participate in the first game event, and the number of known sources of wireless interference that are known for the first game event;
and
(ii) allocating to the second wireless communication system, a number of frequencies that is greater than the sum of: the number of RPVs that is scheduled to participate in the second game event, and the number of known sources of wireless interference that are known for the second game event.

7. The system of claim 1,
wherein said spectrum manager unit further allocates, to each one of the plurality of wireless communications system, maximum power level limits that are associated with each allocated frequency.

8. The system of claim 1,
wherein the first wireless communication system comprises a first local spectrum manager unit, which is configured (I) to continuously monitor and assess channel quality in channels that are allocated to RPVs of the first wireless communication system, and (II) to re-allocate transmission channels and transmit power limits to the PRVs that participate in the first game event;
wherein the second wireless communication system comprises a second local spectrum manager unit, which is configured (I) to continuously monitor and assess channel quality in channels that are allocated to RPVs of the second wireless communication system, and (II) to re-allocate transmission channels and transmit power limits to the PRVs that participate in the second game event;
wherein said spectrum manager unit is a central spectrum manager unit that receives updates from the first local spectrum manager unit and from the second local spectrum manager unit.

9. The system of claim 1,
wherein, prior to the first game event, the first local spectrum manager unit is (i) to perform a pre-event assessment of interfering wireless sources, and (ii) to transmit pre-event assessment information to said central spectrum manager unit;
wherein the central spectrum manager unit takes into account the pre-event assessment information when allocating frequencies to the first wireless communication system.

10. A method of spectrum management and of allocating frequencies for a plurality of wireless communication systems in geographical proximity,
wherein the plurality of wireless communication systems includes at least:
(i) a first wireless communication system which comprises two or more Remotely Pivoted Vehicles (RPVs) that are scheduled to participate in a first game event at a first geographical location in a first time-slot;
(ii) a second wireless communication system which comprises two or more other Remotely Pivoted Vehicles (RPVs) that are scheduled to participate in a second game event at a second geographical location in a second time-slot;
wherein the method is performed by a central spectrum manager unit,
wherein the method comprises:
allocating a first pool of frequencies to the first wireless communication system, and allocating a second, different, pool of frequencies to the second wireless communication system;
wherein each RPV that participates in the first game event utilizes only a frequency that is selected from the first pool of frequencies that was allocated to the first wireless communication system;
wherein each RPV that participates in the second game event utilizes only a frequency that is selected from the second pool of frequencies that was allocated to the second wireless communication system;
wherein said allocating of the first and second pools of frequencies is performed by the central spectrum manager unit by taking into account at least:
(A) the first geographical location of the first game event, and
(B) the second geographical location of the second game event, and
(C) the first time-slot of the first game event, and
(D) the second time-slot of the second game event, and
(E) the maximal number of RPVs that are scheduled to participate in the first game event, and
(F) the maximal number of RPVs that are scheduled to participate in the second game event; and
(G1) a maximum operational radius of the first game event; and
(G2) a maximum operational radius of the second game event; and
(H) location of a radar station that causes wireless interference; and
(I) wireless channels that are allocated for spectator devices in at least one game event.

* * * * *